S. B. FISHER.
ANIMAL TRAP.

No. 191,329.                               Patented May 29, 1877.

Attest:
E. E. Court
Jno. P. Brooks

Inventor:
Samuel B. Fisher,
by C. A. Snow & Co.
Attys.

S. B. FISHER.
ANIMAL TRAP.
No. 191,329. Patented May 29, 1877.
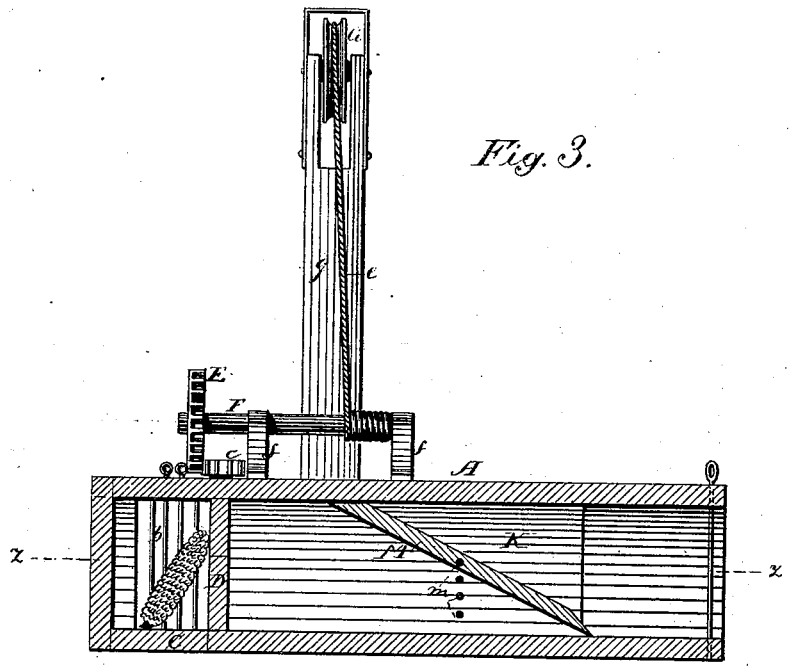
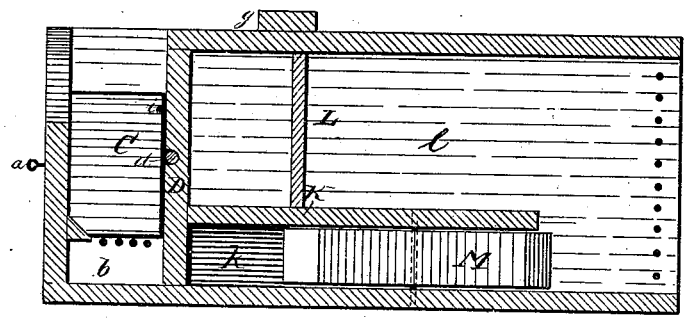
Attest:
E. E. Court
Jno. R. Brooks
Inventor:
Samuel B. Fisher,
by C. A. Snow & Co.
Attys.

UNITED STATES PATENT OFFICE.

SAMUEL B. FISHER, OF PLEASANT UNITY, PENNSYLVANIA.

IMPROVEMENT IN ANIMAL-TRAPS.

Specification forming part of Letters Patent No. 191,329, dated May 29, 1877; application filed April 9, 1877.

*To all whom it may concern:*

Be it known that I, SAMUEL B. FISHER, of Pleasant Unity, in the county of Westmoreland and State of Pennsylvania, have invented certain new and useful Improvements in Animal-Traps; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
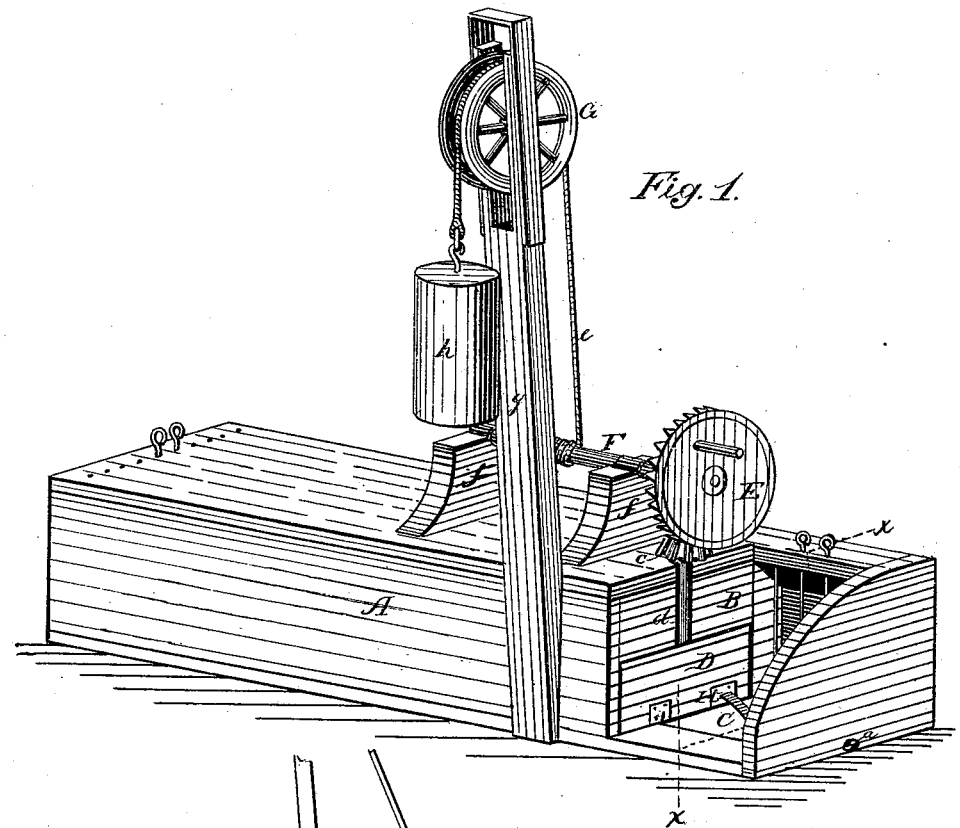
Figure 2:
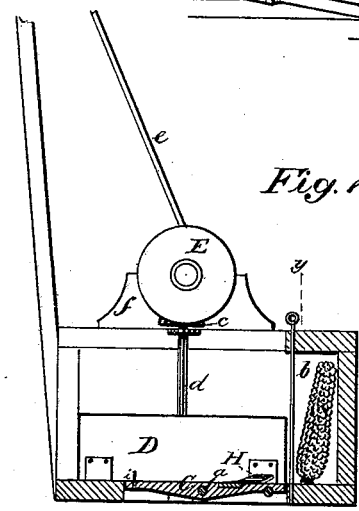

Figure 1 is a perspective view. Fig. 2 is a section on the line $x\,x$. Fig. 3 is a section on the line $y\,y$, and Fig. 4 is a section on the line $z\,z$.

Similar letters of reference indicate corresponding parts in all the figures.

This invention relates to that class of animal-traps which are known as "self-setting"— that is, each animal that is taken resets the trap for the next; and it consists in the construction and arrangement of parts hereinafter more fully shown and described.

In the drawing, A is a wooden box, which may be made of any suitable size, say large enough to hold from twenty to fifty rats or mice. At one end of box A is a recess, B, the bottom of which is formed by a trap-door, C, which is evenly balanced on a removable pivot-pin, $a$. At the end of recess B is a chamber, $b$, in which the bait is placed, a wire partition dividing the recess B from chamber $b$.

The end of box A facing the recess has a door, D, secured upon a pivoted vertical shaft, $d$, having at its upper end a pinion, $c$, engaging with a cog-wheel, E, secured upon the end of a shaft, F, having its bearings in two brackets, $f\,f$, on top of box A. $e$ is a cord, wound around shaft F, and passing from there over a pulley, G, on top of an upright, $g$. To the end of cord $e$ is secured a weight, $h$, which thus, through the mechanism just described, operates the door D, by causing it to rotate with the pivoted shaft $d$. In order however, to prevent the door from rotating except when an animal steps on the trap-door C, I secure to this latter a short pin, $i$, against which the door D presses, thus preventing it from operating. To the door C is also secured a flat spring, H, the end of which reaches to the end of door D, not pressing against pin $i$, and is somewhat raised above the level of the door. The object of this spring will be seen from the following.

When an animal, attracted by the bait in chamber $b$, steps upon the trap-door C in order to get at it, the front end of the trap-door is depressed, thus releasing pin $i$ from door D. This, impelled by the weight $h$, flies around, sweeping the animal before it and into the trap. The fly-door D, sweeping over the slanting spring H at the rear end of door C, depresses this, thus raising the end having the pin $i$ in time to prevent the door D from making more than one-half of a revolution. The raised end of spring H faces the rear end of door D, thus preventing it from being forced open from the inside by the captured animal, and locking the trap completely. The trap-door C in the meantime occupies its original position, and is ready for another operation.

The first compartment into which the animal is pushed when captured is separated from the rest of the trap by partitions K L, arranged as shown in the drawing, with a view to prevent the animal first caught from escaping when another one operates the trap. A pivoted board, M, (the tilting board,) leads from the first compartment $k$ of the trap to the second and much larger compartment $l$. The animal when first caught, naturally being frightened, will seek to escape over the tilting board, which precipitates it into the compartment $l$, from which there is no chance of escaping, a wire partition, $m$, being arranged under the tilting board.

From the foregoing description the operation and advantages of my invention will be readily understood. Its construction is simpler and less complicated than traps of this class which are operated by spring-power, and its operation is certain and efficient.

Having thus described my invention, I claim and desire to secure by Letters Patent of the United States—

1. The trap-box A, having fly-door D, partitions K L, and tilting board M, substantially as and for the purpose herein set forth.

2. The improved animal-trap herein described, consisting, essentially, of the trap-box A, having trap-door C, fly-door D, the shaft of which, $d$, is provided with a pinion, $c$, shaft F, having cog-wheel E, upright $g$, having pulley G, cord $e$, and weight $h$, all combined, arranged, and operating substantially in the manner and for the purpose herein shown and specified.

In testimony that I claim the foregoing as my own I affix my signature in presence of two witnesses.

SAMUEL B. FISHER.

Witnesses:
 SIMON FISHER,
 JOSEPH C. STOUFFER.